United States Patent [19]
Bowen et al.

[11] Patent Number: 5,224,151
[45] Date of Patent: Jun. 29, 1993

[54] AUTOMATIC HANDSET-SPEAKEPHONE SWITCHING ARRANGEMENT FOR PORTABLE COMMUNICATION DEVICE

[75] Inventors: Donald J. Bowen, Aberdeen; Richard H. Erving, Piscataway; Robert R. Miller, II, Morris Township, Morris County, all of N.J.

[73] Assignee: AT&T Bell Laboratories, Murray Hill, N.J.

[21] Appl. No.: 861,713

[22] Filed: Apr. 1, 1992

[51] Int. Cl.[5] .......................................... H04M 11/00
[52] U.S. Cl. ...................................... 379/58; 379/56; 379/61; 379/388; 379/420
[58] Field of Search ....................... 379/56, 58, 61, 63, 379/388, 420; 359/154, 155

[56] References Cited

U.S. PATENT DOCUMENTS 3,109,893  1/1961  Burns .................................... 379/420
5,010,566  4/1991  Seo ......................................... 379/61

FOREIGN PATENT DOCUMENTS 0098059  5/1986  Japan ..................................: 379/388
0098060  5/1986  Japan .................................... 379/388

OTHER PUBLICATIONS

"The Sharper Image" catalog advertisement for 'One-Line Cordless Phone', Jun. 1987, p. 46.
SONY© Cordless Telephone, "SPP-100" Owner's Record, 1985, pp. 1-12.

Primary Examiner—Curtis Kuntz
Assistant Examiner—Dwayne D. Bost
Attorney, Agent, or Firm—A. G. Steinmetz

[57] ABSTRACT

A personal communicator handset is designed to operate as both a handset and as a speakerphone and to automatically switch between the two modes based on distance between the handset and the user's ear. This distance is determined by an infrared range detection unit built into the handset.

17 Claims, 5 Drawing Sheets d = 0 INCHES d = 1-2 FEET d = 1-5 INCHES 5,224,151

AUTOMATIC HANDSET-SPEAKEPHONE SWITCHING ARRANGEMENT FOR PORTABLE COMMUNICATION DEVICE

FIELD OF THE INVENTION

This invention relates to portable communication devices such as are used in cellular and/or wireless radiotelephone systems. It is particularly concerned with a portable communication device adapted for use in both a handset mode of operation with tactile ear contact with the communication device and a speakerphone mode of operation with the communication device at a substantial distance from the ear of the user.

BACKGROUND OF THE INVENTION

Modern telephone systems include many customer features and services that require user/subscriber input to the telephone network subsequent to the initial dial-up performed in the initiation of a call. These features and services may involve interaction with a data base or interaction with a voice mail box for recovery of voice mail messages and/or numerous other operations.

Wireless type portable communication devices typically combine the complete handset and dialing mechanism in a single package. Hence interaction with the telephone network requires one handheld position for receiving audio messages (i.e., tactile ear contact) and a second handheld position (i.e., permitting visual access to the dial mechanism) for operating the dialing mechanism for sending tone and digital messages to the network.

The two modes of operation are incompatible with each other. Either audio contact or visual contact is lost by the user with the handset instrument.

SUMMARY OF THE INVENTION

A personal portable communication device, embodying the principles of the invention, is designed to operate in both an ear coupled handset mode and in an open air loudspeaker or speakerphone mode and to automatically transition between the two modes based on a continuous distance measurement between the handset audio output device and the user's ear. This distance measurement in the illustrative embodiment is determined by an infrared range detection unit built into the handset. It is to be understood that other distance measuring methods such as acoustic echo return systems may be used in this application.

An infrared light source illuminates a surface of the user's head when the communication device is held in the operative position. The distance is determined by measuring the intensity or the strength of the reflected infrared light from the user's head.

DETAILED DESCRIPTION

Figure 1:
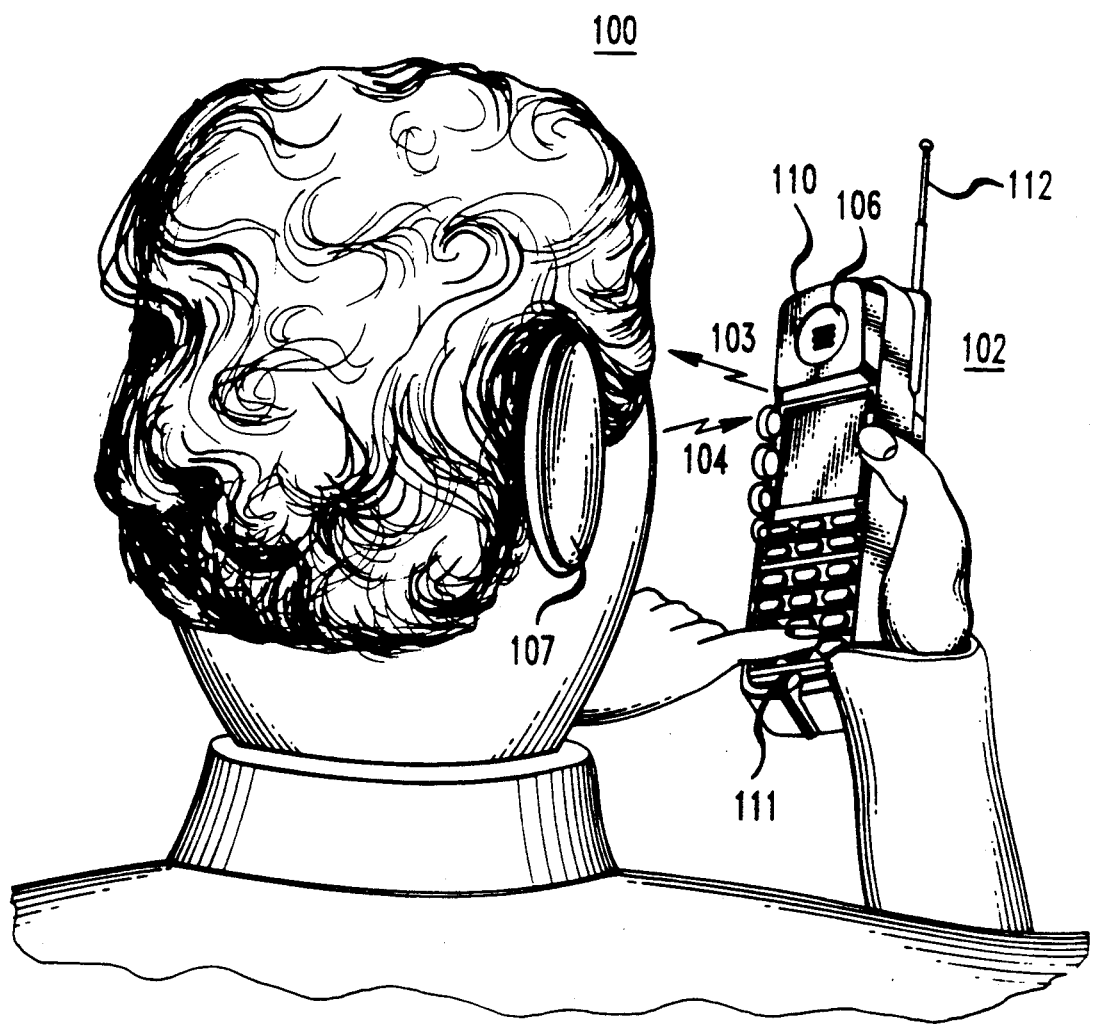
FIG. 1 is a perspective view of a relation between a portable communication device and a user.

A pictorial schematic representation of a portable communication device shows a subscriber's or user's head 100 in close proximity with a portable communication device 102 which includes an infrared range determination apparatus. An infrared light source within the portable communication device 102 projects an infrared light beam 103 which impinges on the cheek surface of the user 100 and produces the reflected infrared light beam 104. The strength or intensity of the reflected infrared light beam 104 is detected by range determination apparatus included within the portable communication device 102.

The portable communication device 102 may comprise a handheld cellular radiotelephone, a wireless communication device or portable telecommunications devices of a similar nature. It includes an acoustic output device 110 (an electrical-to-audio output transducer) surrounded by an ear-conformable structure 106 adapted to be placed in tactile contact with the user's ear 107. An acoustic input device 111 (an audio input to-electrical-transducer) receives an audio input for transmission. An antenna 112 transmits and receives radio frequency signals.

The ear-conformable structure 106 is composed of a soft compliant material such as plastic coated carbon foam, so that it conforms to the contour of the ear 107 when it is in tactile contact with the ear 107. Included with the structure 106 is a mechanism responsive to the conforming action occurring with tactile contact with the ear 107 to provide an indicia of the existence of such contact. In the alternative a capacitive detector may be used to detect very close proximity of the ear piece 106 with the ear 107. Such tactile or capacitive indicia is used as described below for providing a safety mechanism to limit acoustic output when the structure 106 is in tactile or very close contact with the ear.

Figure 2:
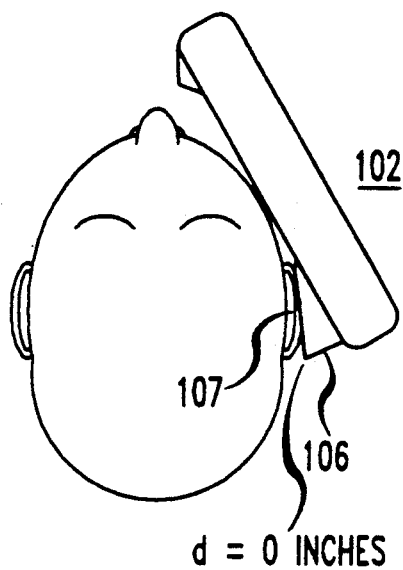
FIGS. 2, 3 and 4 are schematic views of varying distances from the user at which a portable personal communication device may expect to be used.
Figure 4:
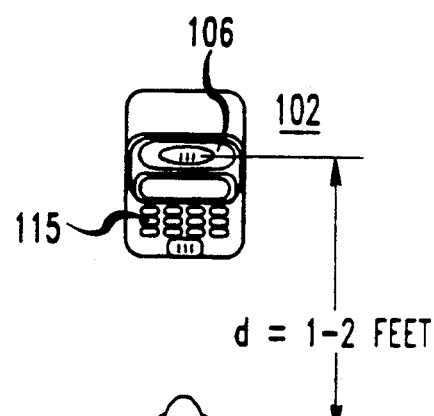
Figure 3:
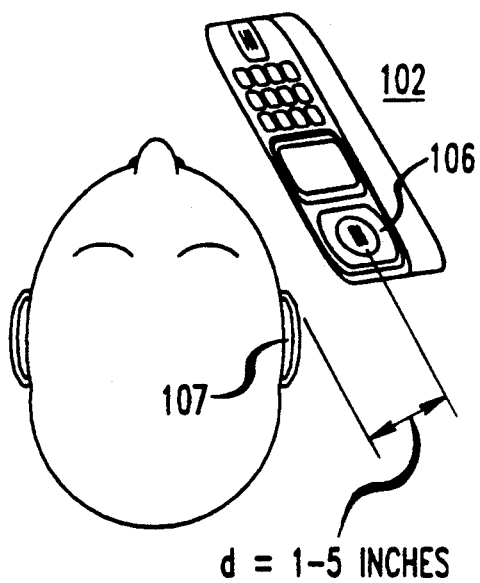

The various positions shown in the FIGS. 2, 3 and 4 indicate typical user positions at which the portable communication device 102 may be used. In FIG. 2 the conforming ear structure 106 is shown in tactile contact with the user's ear 107. In this position, designated as the modal use, the portable communication device 102 is being used as a typical handset. The distance from the acoustic output element 106 to the ear 107 is zero (d=0) and hence the output of the acoustic output device is limited to a low volume output typical of a telephone handset to prevent acoustic shock to the ear of the user. In this particular position the user may not need to access the dial of the portable communication device 102 during the course of the call and hence the tactile contact or very close capacitive sensing controls the range determination.

In FIG. 3 the portable communication device 102 has been moved a short distance away from the ear 107, designated at this distance as a modal-free use. At the distance shown the portable communication device 102 is operating in a modal free operative state which is intermediate between a typical handset type of operation and a speakerphone mode of operation. This distance (shown illustratively as a 5 cm distance, d=5 cm) is a typical transition distance at which an inner mechanism of the portable communication device 102 is transitioning its operation from a handset type of operation to a speakerphone mode of operation. The output of the acoustic output element 106 is amplified to accommodate the increased distance to the ear 107.

The mode of operation of the portable communication device 102 has transitioned to a speakerphone or A/V (audio/visual) mode of operation at the distance shown in FIG. 4. At this distance (d=30-60 cm) the dial mechanism 115 of the portable communication device is readily visible to the user and can easily be used interactively while operatively connected with the telephone network. In this A/V mode the acoustic output element has a speakerphone level output and the sensitivity of the acoustic input element is increased to accommodate the increased distance to the user.

Figure 5:
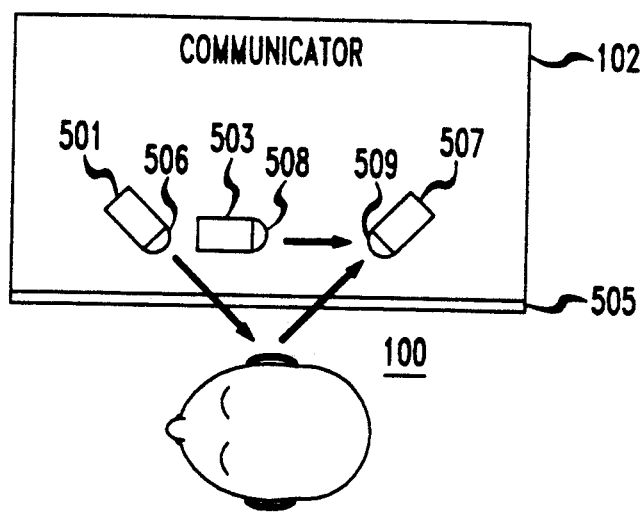
FIG. 5 is a schematic view of the operation of a range detection device to measure distance of the portable personal communication device from the user.

The illumination apparatus providing infrared light and detection of its reflection for use in determining the distance between the portable communication device 102 and the user is shown in schematic cross section in FIG. 5. Two infrared light emitting devices 501 and 503, included in the portable communication device 102, are positioned behind a plastic window operative as an infrared bandpass filter with visible light blocking characteristics. The infrared light, generated by devices 501 and 503, is focused into a beam by the focusing lenses 506 and 508, respectively. Infrared light is emitted in alternative periods by the two infrared light emitting devices 501 and 503. The infrared light emitted by the light emitting device 501 is directed out through the visible light blocking window 505 in the direction of the user 100 of the portable communication device 102. This emitted infrared light is modulated at an rf frequency to produce a pulsed infrared light output at that frequency. This permits the reflected infrared light to be readily distinguished by the distance-measuring circuitry (discussed herein below) from any incidental background infrared light.

The infrared light, reflected from the user 100, is focused by a lens 509 and detected by the photodiode 507 located behind the visible light blocking window 505. It also responds to infrared light supplied by the light emitting device 503 for safety checking and calibration purposes. This infrared light from device 503 is included as a check of operability of the ranging function of the handset to prevent operation of the portable communication device in a speakerphone mode upon failure of one of the infrared light emitting devices or the detector.

Figure 6:
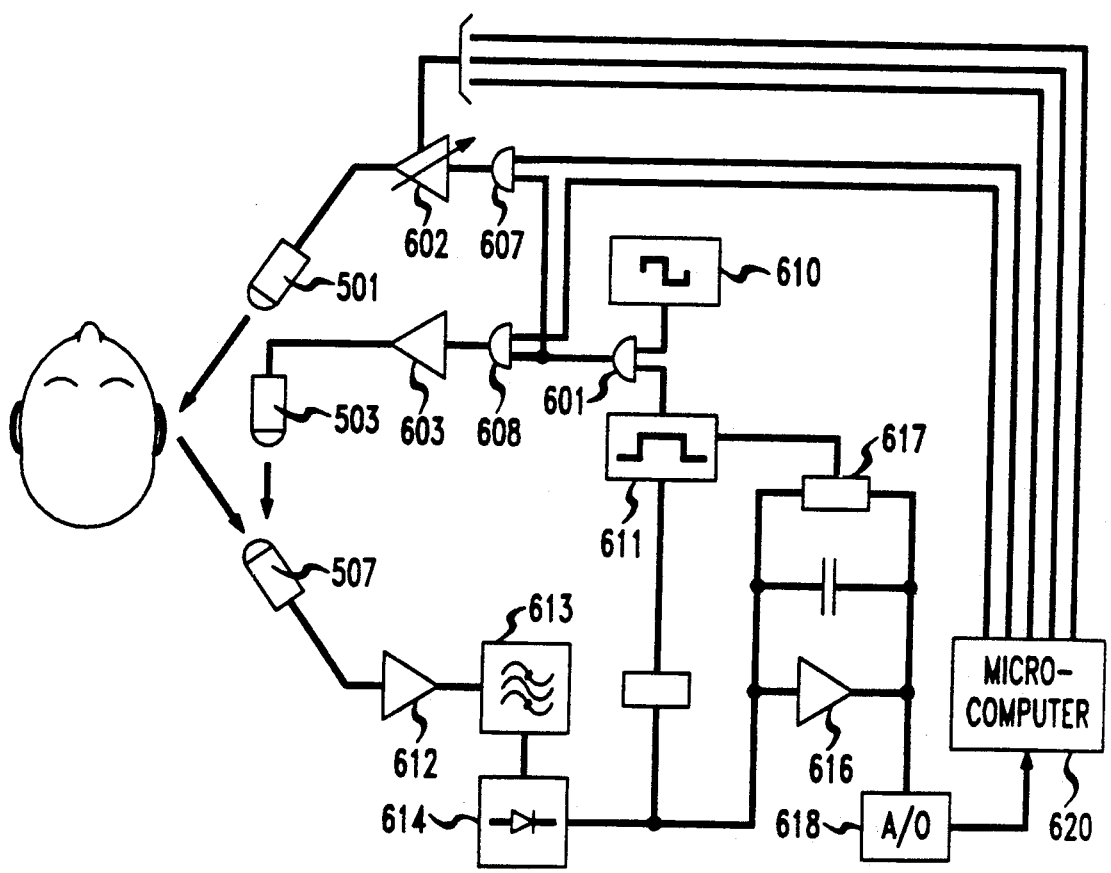
FIG. 6 is a block schematic of a range determination system to evaluate and respond to the distance of the portable personal communication device from the user.

A block schematic in FIG. 6 discusses the controlling circuitry performing the range measurement for enabling an operative transition state of the communication device between the portable communication device and the user. Infrared light for range measurement is supplied by the light emitting device 501 which is energized by the LED driver 602. The second light emitting device 503 is similarly driven by the LED driver 603 to provide a safety check and calibration. LED drivers 602 and 603 may comprise amplifying devices suitable for driving light emitting diodes. The two drivers 602 and 603 are alternately enabled by the enabling LED select gates 606 and 607. Gates 606 and 607 are shown as AND type logic gates. The enabling input on leads 604 and 609 are supplied from a microcomputer 620 whose operation is discussed herein below.

The gates 607 and 608 are enabled in an alternate fashion to each other so that the range determination, operation safety checks and calibration may be performed at different alternative times. Each of the infrared light emitting devices 501 and 503 are driven at an rf modulating frequency supplied by the modulation frequency source 610 for a sample period controlled by the sample period generator 611, which gates the AND gate 601 to enable application of the rf frequency signal to the select gates 607 and 608 for the duration of the sample period.

The reflected infrared light is detected by the photodiode 507, and the electrical signal resulting therefrom is amplified by a photodiode amplifier 612 and applied to a bandpass filter 613 tuned to pass signals at the rf modulation frequency. The output of the filter 613 is rectified and detected by the detector circuit 614 to recover a signal level representative of a strength of the reflected signal. The detected signal level is gated for the sample period duration and applied to the integrator 616 by an input gate 615 controlled by the sample period generator 611 and which connects the output of the detector 613 to the input of the integrator 616, The integrator is periodically reset to zero by the same sample period generator 611, via a capacitor discharge circuit 617.

Figure 7:
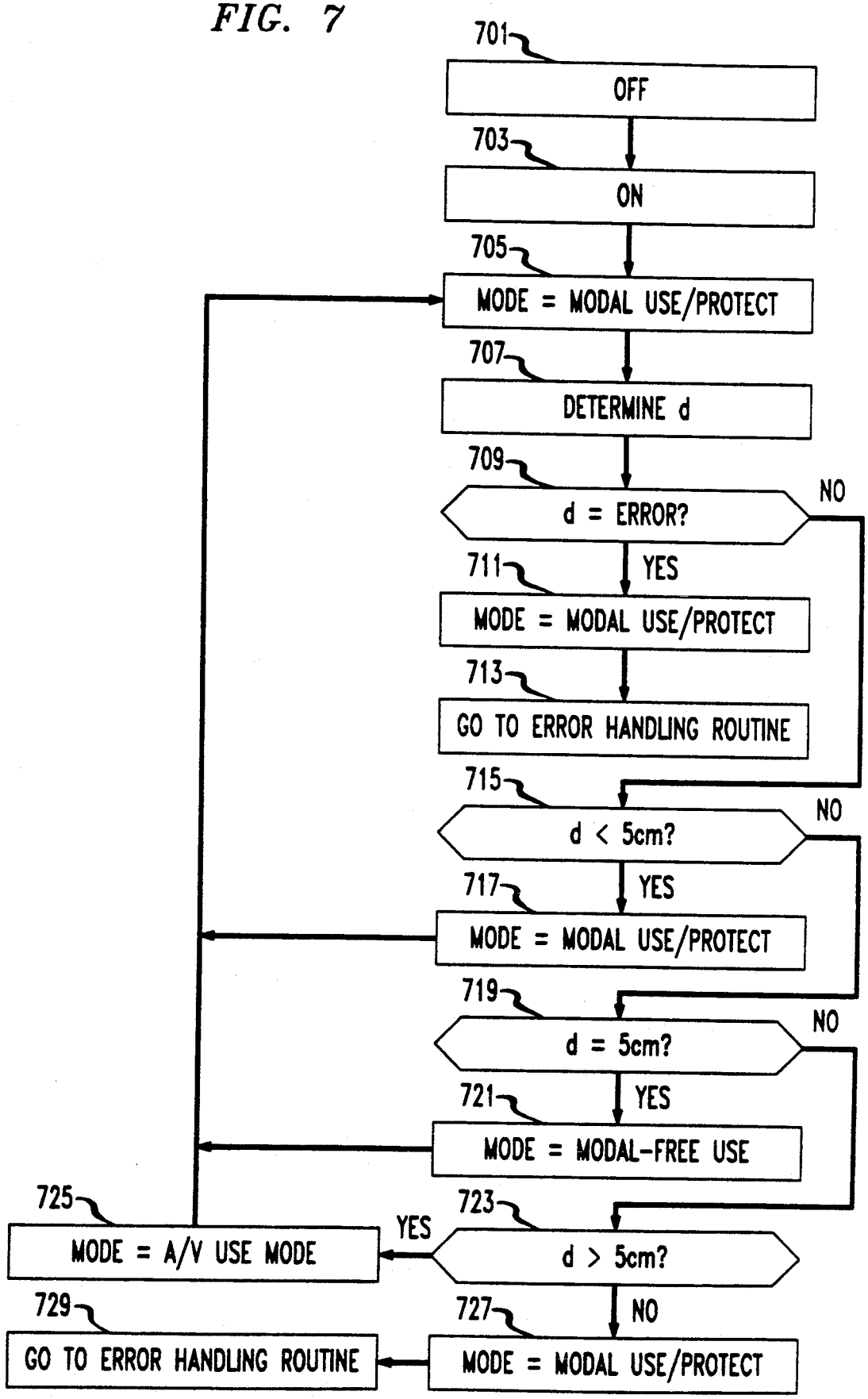
FIG. 7 is a flow diagram depicting the measurement and mode control operations of the microcomputer 620.

The output of the integrator is converted to a digital format by the analog-to-digital converter 618 and the digital signal is applied to the microcomputer 620 for the range determination processing. In addition to the processes of range determination, the microcomputer performs an adaptive audio control process. A microcomputer 620 generates the control signals to alternately enable the gates 607 and 608 and to evaluate the received infrared signal to determine the distance between the communicator and the head of the user. The distance measurement determines the mode in which the communicator is operated. These measurement and mode control operations of the microcomputer 620 are illustrated by the flow diagram of FIG. 7.

If the portable communicator is in the off condition (i.e., not in use) the flow process resides in the quiescent block 701. Upon activation of the communicator device the flow process proceeds immediately to the "on" block 703. The instructions of the subsequent block 705 immediately place the communicator in a modal-use state for protection purposes to prevent occurrence of acoustic shock to the ear of the user. The decision block 706 inquires if the user has manually set the communicator into a modal use. If the user has manually set the use to modal use the block 708 locks its operation into this mode of operation. If the user has not made a manual selection the flow process proceeds to the following block 707.

The instructions of block 707 control operations to measure a distance between the communicator and the user and initiate the process of determining the mode of operation of the personal communicator. Decision block 709 determines if the distance value ascertained by the range detection apparatus is reasonable or in error. If the distance appears to be in error the process continues to the block 711 which maintains the communicator in a protective modal use or handset mode. The flow process proceeds to the error-handling routine of the block 713. This routine may encompass an instruction for locking the communicator into a modal or handset use only for protection of the user from acoustic shock.

If no error is found the flow process proceeds from decision block 709 to block 715. The distance d measured by the ranging apparatus is used as an input to this acoustic adaptation algorithm to set the acoustic response of the communicator.

In addition to the distance parameter d, which is constantly updated, the adaptation algorithm monitors other information as well. The status of the personal communication device determines such information as whether the device has been locked to handset-mode-only for privacy, what level the master-volume control is set to, or other user-adjusted parameters that might influence the desired response of the adaptive algorithm. Hysteresis is present in the algorithm to retard the response of the algorithm to slight changes in the measured distance d, and to optimize the adaptation rate according to human factors considerations.

The adaptive algorithm in block 715 performs four functions. It sets the output sound level of the receiver (i.e., acoustic output device). It sets the output equalization of the receiver. It sets the input sensitivity of the transmitter (i.e., acoustic input device; microphone). And it sets the input equalization of the transmitter. These four adaptations are now described.

The output sound level of the receiver is lowest when the communicator is in contact with the ear (distance $d<1$ cm), where the personal communicator behaves like a handset, and increases as the distance d increases (i.e., proportional to the square of the distance d) to maintain a comparable level at the user's ear. Beyond a nominal distance (about 25 cm) the output sound level remains fixed at a nominal maximum, independent of increasing distance d, and behaves as a typical speakerphone.

The output equalization of the receiver conforms to that of a handset when the communicator is in close contact with the ear (distance $d<1$ cm). When the communicator is drawn away from the ear, the equalization adjusts for the loss of low-frequency response resulting from the opening of the cavity formed between the ear and the handset. As the communicator is drawn further away from the ear (beyond a few centimeters), the equalization begins to adjust for the increase of high-frequency information provided by the diffraction effects of the listener's head and pinna by rolling off the high-frequency output energy. Beyond a nominal distance (about 25 cm) the output equalization remains fixed at a value suitable for speakerphones, independent of increasing distance d, and the communicator behaves as a typical speakerphone.

The input sensitivity of the transmitter is lowest when the communicator is in contact with the ear (distance $d<1$ cm), where the personal communicator behaves like a handset, and increases (roughly proportional to the square of the distance d) to maintain a comparable transmit level. Beyond a nominal distance (about 25 cm) the input sensitivity remains fixed at a nominal maximum, independent of increasing distance d, and behaves as a typical speakerphone.

The input equalization of the transmitter conforms to that of a handset when the communicator is in close contact with the ear (distance $d<1$ cm). As the communicator is drawn away from the ear, the low-frequency transmit response may be rolled off slightly to ameliorate the effects of room reverberation and noise, and emulate a speakerphone.

Figure 8:
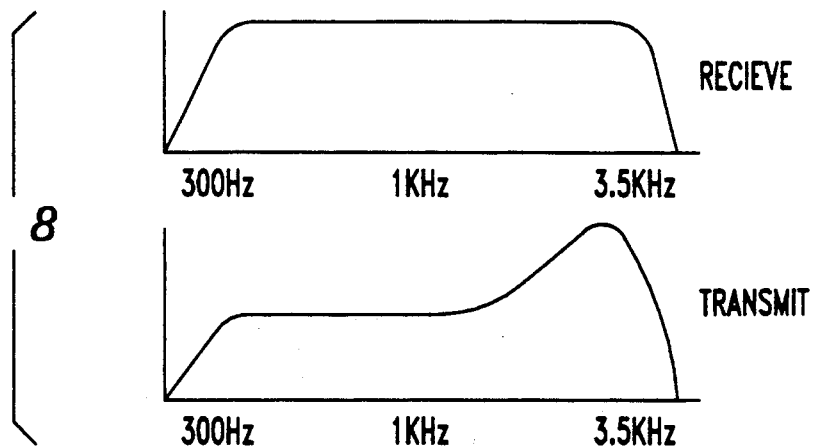
FIGS. 8-10 depict the various acoustic transmit and receive responses in each mode of operation.
Figure 9:
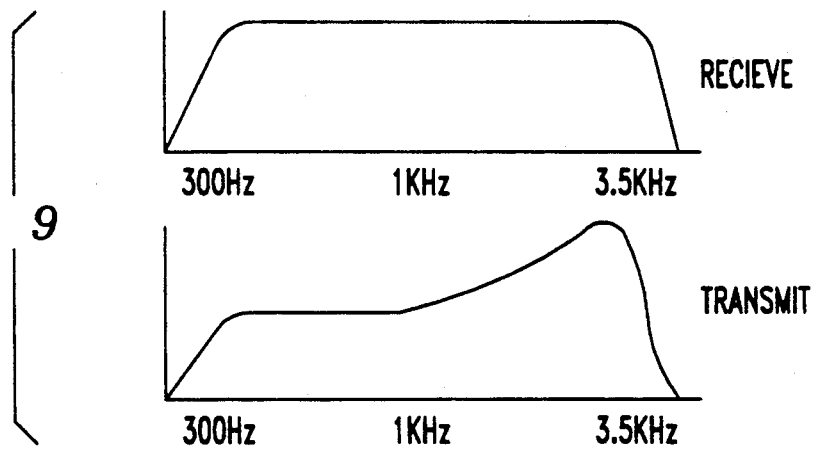
Figure 10:
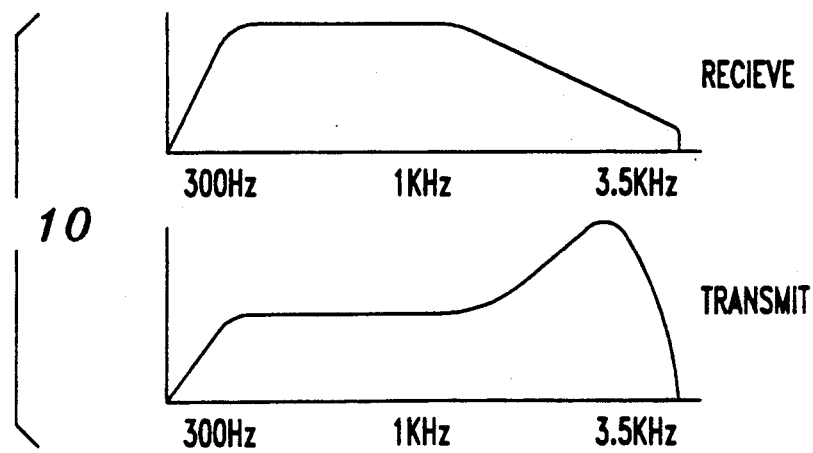

The waveforms of FIGS. 8, 9 and 10 define the various acoustic transmit and receive responses in each mode of operation. These responses are devised in accord with acoustic conditions typical of two conversationalists at a distance of a meter in a noise free anechoic environment. Sound pressure levels are controlled in each mode by microcomputer control of the electrical signals to approximate this conversational environment.

The transmit and receive levels used in the modal mode are shown in the FIG. 8. The receive levels are controlled at a substantially constant level for a frequency range from 300 Hz to 3.5 kHz. The transmit waveform is at a constant level except for an increase to a 6 dB peak at its upper frequency range near 3 kHz as shown. This increase in amplitude at the higher frequencies is in accord with standard telephone practice to maintain a normal face-to-face frequency response. The modal free use characteristics shown in the FIG. 9 are substantially identical in form to those of FIG. 8. The drive signal to the receiver in this mode is however adapted to account for the changing acoustic impedance presented when the communications device is moved away from the ear.

The sound pressure adjustments of the A/V use mode shown in the FIG. 10 have different receive characteristics from those of FIGS. 8 and 9. The receive frequency response rolls off somewhat at frequencies above 1 kHz to accommodate diffraction characteristics due to the exposure of the ear as opposed to handset operation. This roll off in amplitude is needed to undo the peak of the transmit characteristic in order to maintain normal conversational responses.

We claim:

1. A wireless personal communicator, comprising:
   a portable unit including an input-to-electrical transducer and an electrical-to-audio output transducer;
   range detection apparatus for measuring a distance of the portable unit from a user;
   conversion apparatus connected to respond to the range detection apparatus and responsive to a measured threshold distance for controlling a mode of operation of the communicator and a transition from a handset modal operation below a threshold distance and thence through a transition modal-free region to a speakerphone operation at a distance greater than the threshold distance.

2. A wireless personal communicator as claimed in claim 1, and further comprising:
   the range detection apparatus comprising;
   a source of radiant energy;
   a detector of radiant energy;
   circuitry for evaluating an intensity of radiation received by the detector of radiant energy from the source of radiant energy.

3. A wireless personal communicator as claimed in claim 2, and further comprising:
   a second source of radiant energy connected to illuminate the detector of radiant energy for calibration thereof.

4. A wireless personal communicator as claimed in claim 2, and further comprising:
   modulation circuitry for modulating an output of the source of radiant energy, and
   filtering circuitry for limiting illumination of the detector of radiant energy within a bandpass frequency range.

5. A wireless portable personal radiotelephone communication device, comprising:

a portable subscriber handheld structure including in a single package, an audio input-to-electrical transducer and an electrical-to-audio output transducer, the electrical-to-audio output transducer selectively alternatively operative in one mode of operation of an ear coupled handset mode, a continuous transition mode and an open air loudspeaker mode;

a control for controlling selection of the mode of operation for the electrical-to-audio output transducer, including:

range detection apparatus for determining a distance between the electrical-to-audio output transducer of the handheld structure and an ear of a user of the handheld structure; and signal control means for controlling an electrical information signal sent to the electrical-to-audio output transducer to optimize its operation in the selected one of the ear coupled handset mode, the transition mode and the open air loudspeaker mode.

6. A wireless portable personal radiotelephone communication device as claimed in claim 5, and further comprising:

the range detection apparatus including;

a source of infrared light, pulsed at an rf frequency, and included in the handheld structure;

an infrared light detector;

a filter tuned to the rf frequency and coupled to receive for a defined time duration from the infrared light detector; and circuitry for converting an output of the filter to a distance measure.

7. A wireless portable personal radiotelephone communication device as claimed in claim 5, and further comprising:

a secondary sensor for detecting close proximity of the portable subscriber handheld structure with an ear of the user; and circuitry responsive to the secondary sensor for restricting the control for controlling selection to an ear coupled handset mode.

8. A wireless portable personal radiotelephone communication device as claimed in claim 7, and further comprising:

the secondary sensor including apparatus for tactile contact of the portable subscriber handheld structure with an ear of the user.

9. A wireless portable personal radiotelephone communication device as claimed in claim 6, and further comprising:

the circuitry for converting including a gated integrator for for measuring an output of the filter and an analog-to-digital converter for providing a digitized value for the distance; and the signal control means being responsive to the digitized value for the distance.

10. A wireless portable personal radiotelephone communication device as claimed in claim 5, and further comprising:

the signal control means including dynamic circuitry connected to control information signals applied by the telephone communication signal processing circuitry to the electrical-to-audio output transducer in order to shape acoustical output waveforms and set an acoustical amplitude from the electrical-to-audio output transducer in order to optimize acoustic signals to the user for the mode of operation selected.

11. A method of operating a portable wireless communication device comprising the steps of:

measuring a distance between a portable wireless communication device and its user;

adjusting input and output acoustic levels of the portable communication device in response to the distance measure to operate as a speakerphone at long distance greater than a median distance and as a handset at short distance less than a median distance.

12. A method of operating a portable wireless communication device as claimed in claim 11, further comprising the steps of:

modulating the radiant energy beam and recovering the reflected beam and restricting response for measurement to beams at the modulating frequency.

13. A method of operating a portable wireless communication device as claimed in claim 12, further comprising the steps of:

directly illuminating apparatus used for detecting a recovered reflected beam with a second source of illuminating in order to evaluate reliability of the measurement of distance operation.

14. A method of operating a portable wireless communication device comprising the steps of:

operating the portable wireless communication device in a modal mode upon its turn on;

measuring a distance between a portable wireless communication device and its user;

evaluating the measured distance to detect an error of measured distance and restricting operational modes to modal use if error is detected;

if no error is determined, adjusting input and output acoustic levels of the portable communication device in response to the distance measure to operate as a speakerphone at long distance greater than a median distance and as a handset at short distances less than a median distance, and adjusting acoustic equalization as a function of the distance and prior equalization states.

15. A method of operating a portable wireless communication device as claimed in claim 14 and comprising the further steps of:

illuminating the user with a radiant energy beam and recovering reflections from the user in order to measure a distance.

16. A method of operating a portable wireless communication device as claimed in claim 14 and comprising the further steps of:

modulating the radiant energy beam, and recovering the reflected beam and restricting response for measurement to beams at the modulating frequency.

17. A method of operating a portable wireless communication device as claimed in claim 14 and comprising the further steps of:

directly illuminating apparatus used for detecting a recovered reflected beam with a second source of illumination in order to evaluate reliability of the measurement of distance operation.

* * * * *